United States Patent
Qiu et al.

(10) Patent No.: US 7,366,130 B2
(45) Date of Patent: Apr. 29, 2008

(54) BASE STATION AND TRANSMISSION POWER DETERMINING METHOD IN MOBILE COMMUNICATIONS SYSTEMS

(75) Inventors: Heng Qiu, Yokosuka (JP); Hidetoshi Kayama, Yokohama (JP); Narumi Umeda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 538 days.

(21) Appl. No.: 10/981,480

(22) Filed: Nov. 5, 2004

(65) Prior Publication Data

US 2005/0099973 A1    May 12, 2005

(30) Foreign Application Priority Data

Nov. 7, 2003    (JP)    ............................. 2003-379171

(51) Int. Cl.
*H04Q 7/00*    (2006.01)
(52) U.S. Cl. ............... 370/328; 370/332; 370/338; 455/561; 455/550.1
(58) Field of Classification Search ............... 370/328, 370/332, 338; 455/561, 550.1
See application file for complete search history.

(56) References Cited

U.S. PATENT DOCUMENTS

| | | | | |
|---|---|---|---|---|
| 6,044,067 A * | 3/2000 | Suzuki | ............... | 370/252 |
| 2002/0196751 A1* | 12/2002 | Parizhsky et al. | ............ | 370/329 |
| 2004/0203981 A1* | 10/2004 | Budka et al. | ............... | 455/522 |
| 2006/0153061 A1* | 7/2006 | Nishio | ............... | 370/208 |

FOREIGN PATENT DOCUMENTS

| | | |
|---|---|---|
| EP | 1 317 103 A2 | 6/2003 |
| WO | WO 01/54302 A1 | 7/2001 |

OTHER PUBLICATIONS

Deepak Ayyagari, et al., "Power Control for Link Quality Protection in Cellular DS-CDMA Networks with Integrated (packet and Circuit) Services", Proceedings of the 5th Annual ACM/IEEE International Conference on Mobile Computing and Networking, vol. conf. 5, XP-000896076, Aug. 15, 1999, pp. 96-101.

* cited by examiner

*Primary Examiner*—Danh Le
(74) *Attorney, Agent, or Firm*—Oblon, Spivak, McClelland, Maier & Neustadt, P.C.

(57) ABSTRACT

In a disclosed mobile communications system wherein packet communication between a base station and its subordinated mobile station is established based on a reservation packet, the packet communication uses controlled transmission power and a radio resource allocated based on reception quality information received from the mobile station. The base station comprises a memory for storing its own cell reception power transmitted from the mobile station based on radio resource allocation status for the mobile station; a neighboring interference calculating unit for calculating neighboring cell interference based on the its own cell reception power and the reception quality information; an interference margin determining unit for establishing neighboring cell interference margin for preparing for neighboring cell interference; and a transmission power determining unit for determining transmission power for each packet transmitted from the mobile station based on the reception quality information and the interference margin.

8 Claims, 6 Drawing Sheets

FIG.5

$$\sum_{i=1-n} Pi + P_{neighbor} + N = P_r \quad (1)$$

$P_i$: TARGET RECEPTION POWER OF THE iTH PACKET IN CELL
N: THE NUMBER OF PACKETS TRANSMITTED IN CORRESPONDING PERIOD IN CELL
$P_{neighbor}$: INTERFERENCE POWER FROM NEIGHBORING CELLS
N: THERMAL NOISE
$P_r$: GRAND TOTAL RECEPTION POWER AT BASE STATION $$\frac{P_i * SF_i}{P_r - P_i} = SINR_i \quad (2)$$

$SF_i$: DISTRIBUTION RATE FOR THE iTH PACKET
$SINR_i$: TARGET SIGNAL INTERFERENCE POWER RATIO FOR THE iTH PACKET $$(2) \rightarrow \quad P_i = \frac{P_r * SINR_i}{SF_i - SINR_i} \quad (3)$$

SUBSTITUTE (3) INTO (1)

$$P_i = \frac{SINR_i}{SF_i - SINR_i} * \frac{P_{neighbor} + N}{1 - \sum_{i=1-n} \frac{SINR_i}{SF_i + SINR_i}} \quad (4)$$

COMMUNICATION SUCCESS CONDITION:

$$P_i + P_{attenu} \leq P_{imax} \quad (5)$$

$P_{attenu}$: TRANSMISSION LOSS FOR THE iTH PACKET
$P_{imax}$: MOBILE STATION MAXIMUM TRANSMISSION POWER FOR THE iTH PACKET IN CASE WHERE INDIVIDUAL CONTROL CHANNEL DCCH IS USED, Pi IN THE ABOVE EQUATIONS IS CHANGED TO $(Pi + P_{iDCH})$, AND CALCULATE Pi IN THE SAME MANNER

BASE STATION AND TRANSMISSION POWER DETERMINING METHOD IN MOBILE COMMUNICATIONS SYSTEMS

BACKGROUND OF THE INVENTION

The present invention generally relates to base stations and transmission power determining methods in mobile communications systems and, more particularly, to a base station and transmission power determining method which determine the transmission power in consideration of only neighboring cell interference margin for preparing for neighboring cell interference.

In mobile communications systems utilizing CDMA (Code Division Multiple Access) system, etc., signal-to-interference power ratio (SIR) satisfying predetermined reception quality (such as Bit Error Rate (BER) or Block Error Rate (BLER)) at a base station is measured. A high speed transmission power control (TPC: Transport Format Combination Indicator) based on the measurement can be applied to uplink and downlink to minimize the transmission power with respect to a required reception quality and therefore increase system capacity.

In the uplink, especially, when plural mobile stations transmit with the same power, their transmission losses become larger as mobile stations are located farther from the base station. As a result, the received signal from a mobile station located far from the base station (that is close to the cell edge) is masked by the received signal from a mobile station close to the base station at a base station receiver input. In order to solve this problem, the high speed TPC is needed to control the transmission powers of mobile stations so that the SIR from each mobile station is constant at the base station reception.

The high speed TPC based on the SIR measurement comprises an inner loop and an outer loop. In the inner loop, the SIRs of signals after Rake-synthesizing each slot are measured, and the transmission power is controlled so that the measured SIR becomes equal to a target SIR. In order to control the transmission power, two value TPC commands are generated and transmitted using one of a pair of links (for example, using down link when controlling uplink).

It is known that reception power distribution when performing the high speed TPC is approximate to a logarithmic normal distribution. In order to realize highly accurate TPC, precise SIR measurement is required. A prior method was proposed, in which each path SIR is measured and added to obtain equivalent SIR after Rake-synthesis instead of direct measurement of SIR after Rake-synthesis. In this method, more precise SIR measurement can be performed compared with the direct measurement of SIR after Rake-synthesis, because the influence by the channel estimation error can be reduced.

In the inner loop, the revision of the transmission power is done for each slot (for example, 0.667 ms). Large step sizes for revising the transmission power can follow sudden and drastic changes in transmission path. However, too large a step results in a large distribution or deviation in reception power compared with a constant status and degrades characteristics. As a result, it is reported that a step size of 1 dB provides the best characteristics.

On the other hand, the same target SIR may provide different reception qualities (BLER or BER), depending on transmission environment such as the number of transmission paths and a moving speed (maximum Doppler frequency) of the mobile station, difference in SIR measurement methods and interference variation, etc.

Accordingly, it is possible by the outer loop to measure reception quality over a long period and correct (set a correcting margin) a target SIR with a slow period based on the measured reception quality. However, in high quality and high speed data transmission technology, in order to improve the following characteristics against the outer loop transmission environmental variation, another method can be utilized, in which binary or two-valued determination data after error correction and decoding are re-channel coded instead of correcting the target SIR with BLER, and the BER of a provisional determination data train after Rake-synthesis is obtained using the data train after interleaving as reference data. The target SIR is corrected so that the measured value becomes equal to the target BER value.

In line switching situations, traffic varies only per session, and interference variation is not so drastic. On the other hand, in packet communication, traffic does change per packet, and the interference variation is significantly greater compared with line switching. It is very difficult to follow the significantly varying interference in packet communications. In the prior art, in order to deal with this significant interference variation, a target reception power for the next time unit is controlled based on the present measured total interference including interference margin.

However, there is a problem in that adding a large interference margin increases transmission power and decreases system throughput.

The inventors of the present invention found that when using a reservation type access system, a base station can completely forecast or predict interference within its own cell for the next time unit based on allocation information (because all transmissions are allocated by the base station). And therefore margin for dealing with the interference within its own cell is not needed. The reservation type access system is a system in which a base station receives a reservation signal from a mobile station before packet transmission, and the base station allocates a radio resource required for transmitting packets.

SUMMARY OF THE INVENTION

A general object of the present invention is to provide a radio packet communications system and communication method that set interference margin only against neighboring cell interference to improve system throughput.

The above object of the present invention is achieved by, in a mobile communications system wherein packet communication between a base station and its subordinated mobile station is established based on a reservation packet, the packet communication using controlled transmission power and a radio resource allocated based on reception quality information received from the mobile station, the base station comprising: a memory for storing its own cell reception power transmitted from the mobile station based on radio resource allocation status for the mobile station; a neighboring interference calculating unit for calculating neighboring cell interference based on the its own cell reception power and the reception quality information; an interference margin determining unit for establishing neighboring cell interference margin for preparing for neighboring cell interference; and a transmission power determining unit for determining a transmission power for each packet transmitted from the mobile station based on the reception quality information and the interference margin.

The base station further comprises: a packet allocating unit for allocating a predetermined packet value for its own cell packet; wherein the transmission power determining unit determines based on the predetermined packet value and the interference margin when the radio resource is allocated to the packet as a new reservation.

In the base station, a rate assumed for the new packet may be changed and the interference margin may be calculated with respect to the changed rate, when the transmission power required for any packet exceeds a maximum transmission power of the mobile station.

In the base station, a rate assumed for the new packet may be allocated and a difference between the reception powers may be communicated to the mobile station, when the transmission powers required for all packets do not exceed a threshold.

The above object of the present invention is also achieved by, in a mobile communications system wherein packet communication between a base station and its subordinated mobile station is determined based on a reservation packet, the packet communication using a controlled transmission power and a radio resource allocated based on reception quality information received from the mobile station, a transmission power determining method comprising the steps of: a storing step, in a memory, for storing its own cell reception power transmitted from the mobile station based on radio resource allocation status for the mobile station; a calculating step, in a neighboring interference calculating unit, for calculating neighboring cell interference based on its own cell reception power and the reception quality information;

a margin determining step, in an interference margin determining unit, for establishing neighboring cell interference margin for preparing for neighboring cell interference; and a transmission power determining step, in a transmission power determining unit, for determining a transmission power for each packet transmitted from the mobile station based on the reception quality information and the interference margin.

The method may further comprises the step of: an allocating step, in a packet allocating unit, for allocating a predetermined packet value for its own cell packet; wherein the transmission power determining unit determines power based on the predetermined packet value and the interference margin when the radio resource is allocated to the packet as a new reservation.

In the method a rate assumed for the new packet may be changed and the interference margin may be calculated with respect to the changed rate, when the transmission power required for any packet exceeds a maximum transmission power of the mobile station.

In the method, a rate assumed for the new packet may be allocated and a difference between the reception powers may be communicated to the mobile station, when the transmission powers required for all packets do not exceed a threshold.

BRIEF DESCRIPTION OF THE DRAWINGS

FIG. 5 illustrates the basis of the Equation for calculating target reception power.

DESCRIPTION OF THE PREFERRED EMBODIMENTS

The following is a description of embodiments of the present invention, with reference to the accompanying drawings. A radio packet communications system according to embodiments of the present invention separates the grand total interference into neighboring cell interference and its own cell interference. Allocation status within the own cell is stored. The total reception power within the own cell and thermal noise are subtracted from the measured grand total reception power to obtain the present neighboring cell interference. The sum of thus obtained present neighboring cell interference and an interference margin is defined as a neighboring cell interference for the next unit time.

Figure 1:
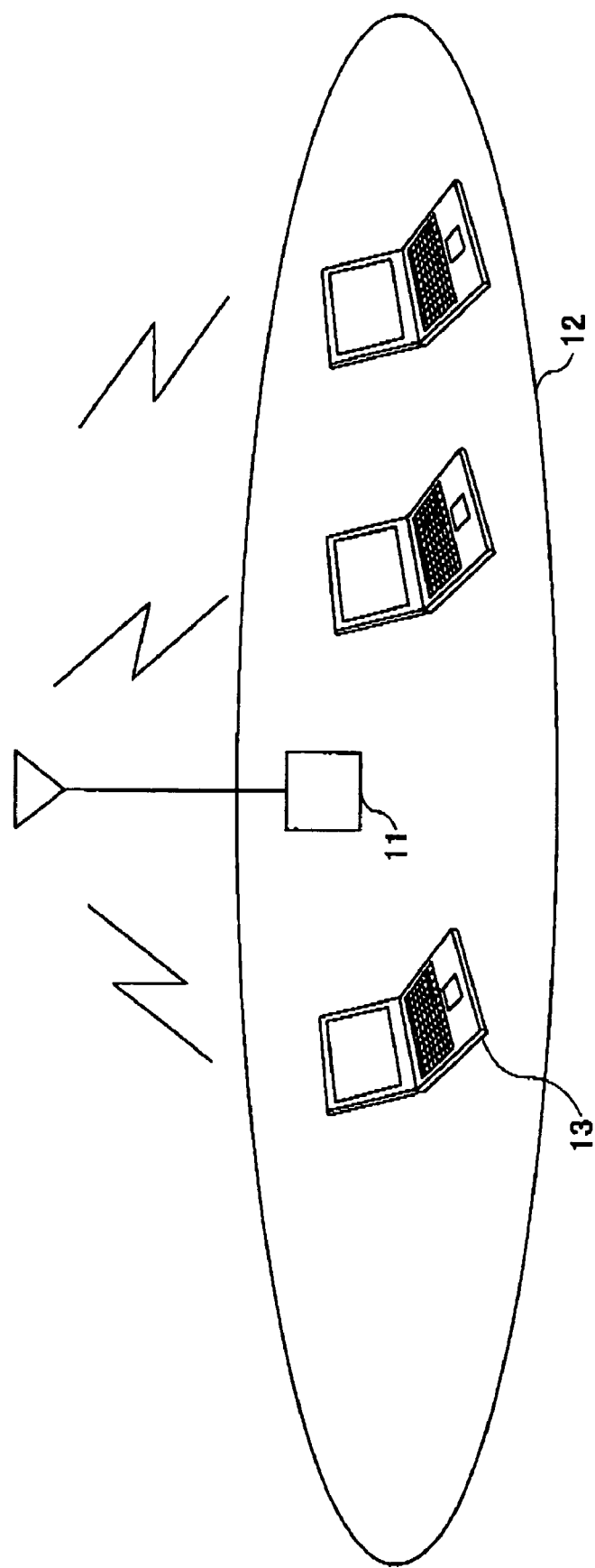
FIG. 1 is a schematic diagram of a mobile communications system to which the present invention can be applied.

FIG. 1 is a schematic diagram of a mobile communications system to which the present invention can be applied. In the mobile communications system shown in FIG. 1, plural mobile stations 13 exist in a radio zone (cell) 12 established by a radio base station 11. Between the base station 11 and the mobile stations 12 belonging thereto, packets are transmitted. The transmitted packets are multiplexed in the Code Division Multiple Access manner on a radio communication link. Transmission time is divided into time slots.

Figure 2:
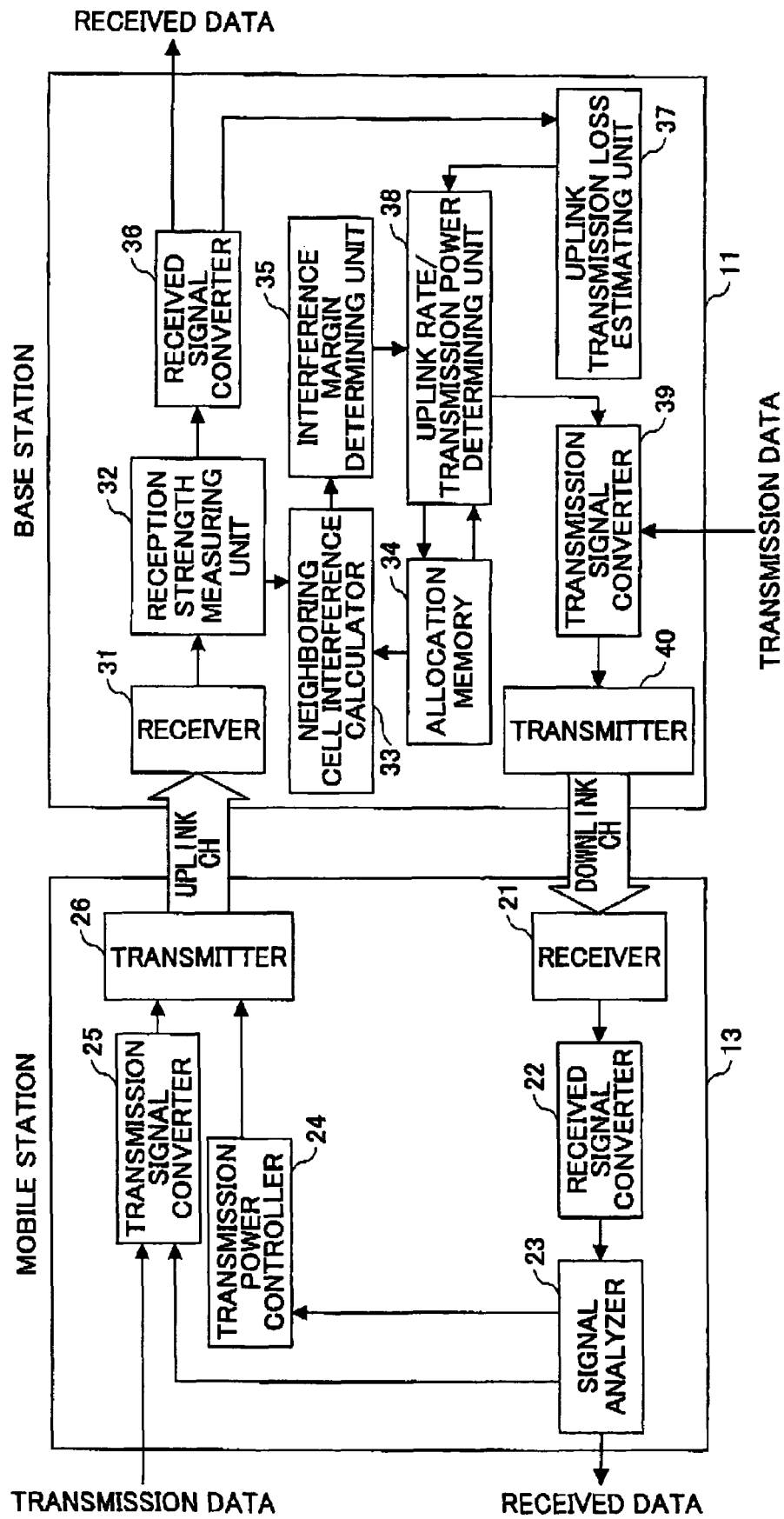
FIG. 2 is a block diagram of a radio base station 11 and a mobile station 13 according to an embodiment of the present invention.

FIG. 2 is a block diagram illustrating structures of the radio base station 11 and the mobile station 13, according to an embodiment of the present invention. As shown in FIG. 2, the mobile station 13 comprises a receiver 21, a received signal converter 22, a signal analyzer 23, a transmission power controller 24, a transmission signal converter 25, and a transmitter 26.

Operation in the Mobile Station

The receiver 21 receives a pilot channel signal, a calling signal, an allocation signal, a connection signal and data packets, etc., via a radio communication link, and inputs the received signals to the received signal converter 22.

The received signal converter 22 performs demodulating, despreading and decoding operations on the signals received by the receiver 21, and outputs the converted signals to the signal analyzer 23. The signal analyzer 23 analyzes the converted signals, and outputs its analysis results to various units depending on the received signals.

Information on allocation signals (including allocated transmission rates and transmission time domain) allocated to the data packets transmitted by the base station 11 is output to the transmission signal converter 25. Information on transmission power of the data packets transmitted by the base station 11 is output to the transmission power controller 24. The received data packets are output to the outside as received data.

Based on the allocation signal (including allocated transmission rates and transmission time domain) analyzed by the signal analyzer 23, the transmission signal converter 25 determines transmission spreading rates, modulation method, coding rates, etc. Based on the determination, the transmission signal converter 25 performs coding, spreading and modulating operations on the transmission data, and outputs the converted signals to the transmitter 26.

Based on the transmission power control information received from the signal analyzer 23, the transmission power controller 24 controls the transmission power of the data packet signals transmitted by the transmitter 26.

The transmitter 26 transmits the signals with the transmission power determined by the transmission power controller 24, to a receiver 31 of the base station 11 via a radio communication link.

Operation in the Base Station

The base station 11 comprises a receiver 31, a reception strength measuring unit 32, a neighboring cell interference calculator 33, an allocation memory 34, an interference margin determining unit 35, a received signal converter 36, an uplink transmission loss estimating unit 37, an uplink rate/transmission power determining unit 38, a transmission signal converter 39, and a transmitter 40.

The receiver 31 receives the signal transmitted from the mobile station 13 via the radio communication link. The received signal is output via the reception strength measuring unit 32 to the received signal converter 36. The transmitter 40 transmits various signals to the receiver 21 of the mobile station 13 via the radio communication link.

The reception strength measuring unit 32 measures a received power and outputs measured results to the neighboring cell interference calculator 33, and outputs the received data as is to the received signal converter 36.

The allocation memory 34 stores packet specifying values (referred to as "packet predetermined values") such as the number of packets and a packet rate or the number of packets and packet transmission power allocated by the base station to each time slot. The allocation memory 34 outputs the total reception power allocated to its own cell packets of the present time slot.

The neighboring cell interference calculator 33 subtracts the total reception power received from the allocation memory 34 from the reception power strength obtained from the reception strength measuring unit 32, obtains a sum of the neighboring cell interference and thermal noise, and outputs the obtained sum to the interference margin determining unit 35.

Operation in the Interference Determining Unit

The interference margin determining unit 35 can vary margin, based on the transmission environments of its own cell and neighboring cells, and mobile station distributions. For example, the interference margin determining unit 35 determines the margin in the following manner. In the case of reserved packet communication, the neighboring cell interference distribution is similar to a logarithmic normal distribution (with low traffic). Therefore, the following Method 1 or Method 2 can be used to calculate the margin.

Method 1

An average of the neighboring cell interference and a deviation of the neighboring cell interference are calculated for a certain period in the past (for example, a past five-second period) to obtain the margin using the following equation (A).

$$\text{Margin} = (\text{Average of neighboring cell interference}) + (\text{Deviation}) \times \phi(t) \quad \text{Equation (A)}$$

Wherein, $\phi(t)$ in the Equation (A) is a distribution function of standard normal distribution, and t is a target error rate. For example, when t is 3%, $\phi(t)$ becomes 1.88, and when t is 1%, $\phi(t)$ becomes 2.33.

Method 2

An average and the deviation of the neighboring cell interference power differences between successive slots in a certain period in the past are calculated for the certain period in the past to obtain the margin to be used for the next slot, using the following equation (A).

$$\text{Margin} = (\text{Neighboring cell interference power of the present slot}) + (\text{Average of differences between successive slots}) + (\text{Deviation of differences between successive slots}) \times \phi(t) \quad \text{Equation (B)}$$

Wherein, $\phi(t)$ in the Equation (B) is a distribution function of the standard normal distribution.

The more the interference average increases, the more the required margin increases. Therefore, the following Method 3 is also possible.

Method 3

$$\text{Margin} = x \times a(x) \quad \text{Equation (C)}$$

Wherein x means an average interference amount for a certain period in the past, and a(x) is a coefficient dependent on the average interference and non-linear to x. This coefficient is adjusted in accordance with a bit error rate or packet error rate. For example, when $a(x_1)$ corresponding to an average interference $x_1$ is 1.8, and an average error rate for $a(x_1)$ of 1.8 is 0.08 larger than a target value of 0.03 (that is, the interference is large), the next $a(x_1)$ is adjusted to $a(x_1)-1.8+0.2=2.0$. On the other hand, when an average error rate for $a(x_1)$ of 1.8 is 0.01 smaller than a target value of 0.03 (that is, the interference is small), the next $a(x_1)$ is adjusted to $a(x_1)=1.8-0.2=1.6$.

Over a long period (for example one week), averages of the neighboring cell interference and variation in the neighboring cell interference between successive time slots for the averages are calculated, and deviation (variation average is zero) of the neighboring cell interference variation between successive time slots corresponding to the averages is calculated. A sum of neighboring cell interferences in the present time slot and an interference deviation corresponding to the interferences is set as an interference power margin for preparing for the interference from neighboring cells. The interference power margin is output to the uplink rate/transmission power determining unit 38.

The received signal converter 36 despreads and decodes the received signals from the reception strength measuring unit 32, and outputs the received and converted data as uplink data. The received signal converter 36 also outputs received reservation signals via the uplink transmission loss estimating unit 37 to the uplink rate/transmission power determining unit 38.

The uplink transmission loss estimating unit 37 uses the difference between the transmission power (that is written in the reservation signal by the mobile station) of the reservation signal and the reception power (that is written by the mobile station), estimates and stores the uplink transmission loss, and then outputs the estimated uplink transmission loss value to the uplink rate/transmission power determining unit 30.

Control in the Uplink Rate/Transmission Power Determining Unit

The control in the uplink rate/transmission power determining unit 38 is different depending on whether there exists a new reservation. First, an explanation is given below with respect to the case where there exists a new reservation.

Control with a New Reservation

When allocating for a new reservation, the following calculation is started from the next slot. First, it is assumed that the maximum rate selected among rates divided into several ranks is allocated to the new reservation. Using the interference margin for preparing for neighboring cell interferences communicated from the interference margin determining unit 35, the signal-to-interference power ratio (SIR) between a new packet and each packet continuously transmitted in the next slot, and the spreading rate of each packet, a target reception power for each packet is calculated by the following Equation (1). The basis of Equation (1) is illustrated in FIG. 5.

$$P_i = \frac{SINR_i}{SF_i + SINR_i} * \frac{P_{margin}}{1 - \sum_{i=1=n} \frac{SINR_i}{SF_i + SINR_i}} \quad \text{Equation (1)}$$

Wherein $P_i$ means the target reception power of the ith packet in the cell, n is the number of packets transmitted during the corresponding period in the cell, $SF_i$ is the spreading rate of the ith packet, $SINR_i$ is the target signal-to-interference power ratio of the ith packet, and $P_{margin}$ is the interference margin for preparing for the neighboring interfering cells.

Based on the target reception power $P_i$ and each packet transmission loss provided from the uplink transmission loss estimating unit 37, the transmission power required for each packet is calculated. When none of the transmission powers required for the packets exceed the maximum transmission power of the mobile station, the maximum rate and the calculated transmission power are allocated to the new packet according to the assumption. When revising a required transmission power, the mobile station that is continuously communicating is notified.

If the transmission power required for any packet exceeds the maximum transmission power of the mobile station, the assumed rate for the new packet is downgraded by one rank. The above calculation is performed again with respect to this newly established rate. It is determined whether any of thus calculated transmission powers required for packets exceed the maximum transmission power. If none of the transmission powers required for the packets exceed the maximum transmission power of the mobile station, the above mentioned newly established rate and calculated transmission power are allocated to the new packet. When revising a required transmission power, the mobile station that is continuously communicating is notified.

If any of the transmission powers required for the packets still exceeds the maximum transmission power of the mobile station, the assumed rate for the new packet is further downgraded by one rank, and the above mentioned calculation is performed again with respect to the newly re-established rate. In a case where the transmission power required for any packet exceeds the maximum transmission power of the mobile station, even if the assumed rate for the new packet is downgraded to the minimum rate, the above mentioned calculation is performed again during a slot after the next slot, and the calculations are repeated for a certain time period from the time of receiving the reservation signal. Even though, if the transmission power required for any packet exceeds the maximum transmission power of the mobile station, the new packet reservation is denied or held.

Control without a New Reservation

When there is not any new reservation, a target reception power is calculated using the above Equation (1) with respect to all the packets to be transmitted in the next slot. A difference between the target reception power for the next slot and the target reception power of the present slot is communicated to the mobile station. The transmission signal converter 39 codes and spreads the allocation results (the rate and transmission power are allocated to the new reservation, and only an adjusting instruction for the transmission power is allocated to continuously transmitted packets) given by the uplink rate/transmission power determining unit 38 and downlink transmission data, and the transmitter 40 transmits them to the receiver 21 of the mobile station 13.

Figure 3A:
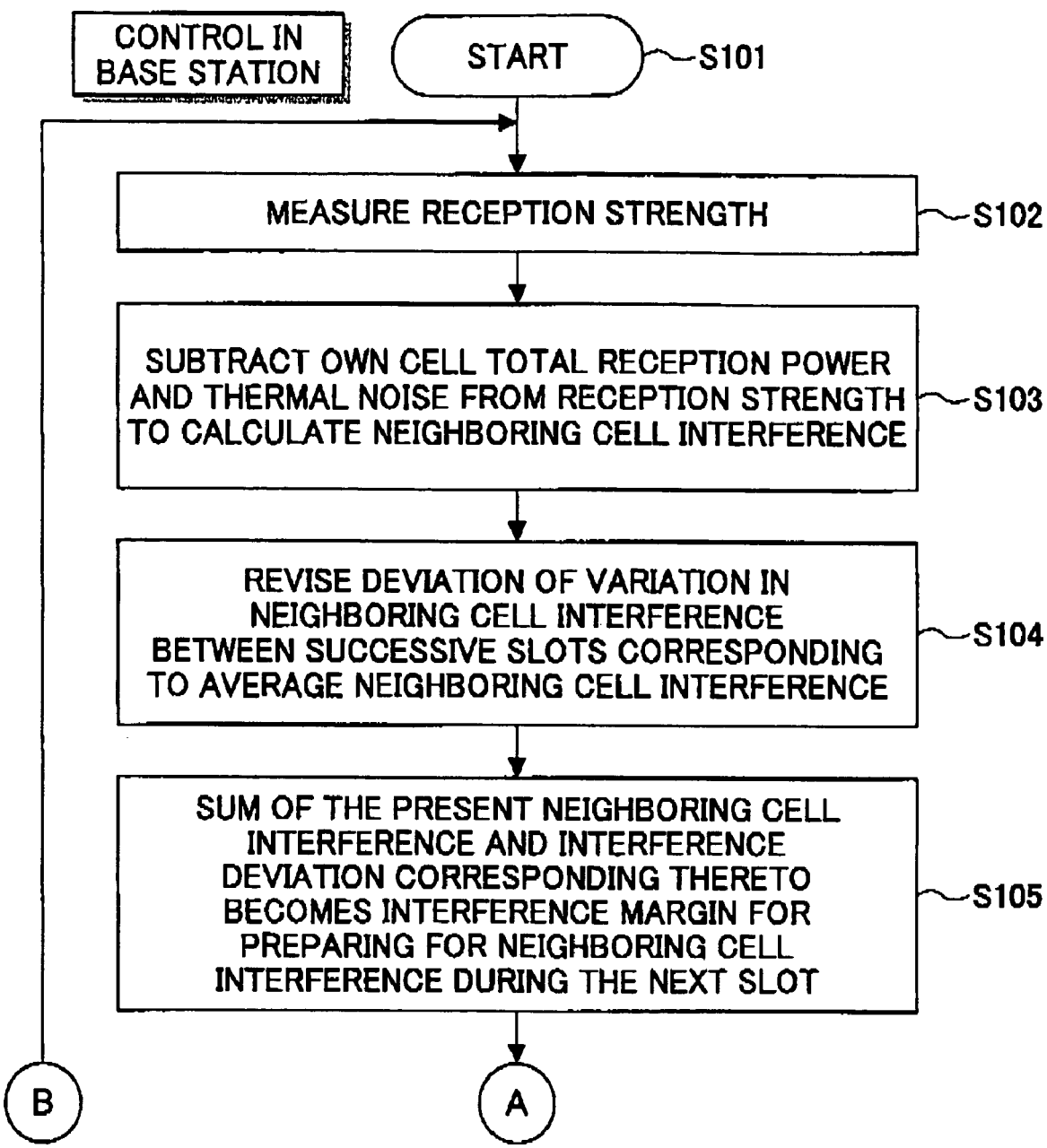
FIG. 3 is a flowchart illustrating base station controlling procedures when SIR is constant.
Figure 3B:
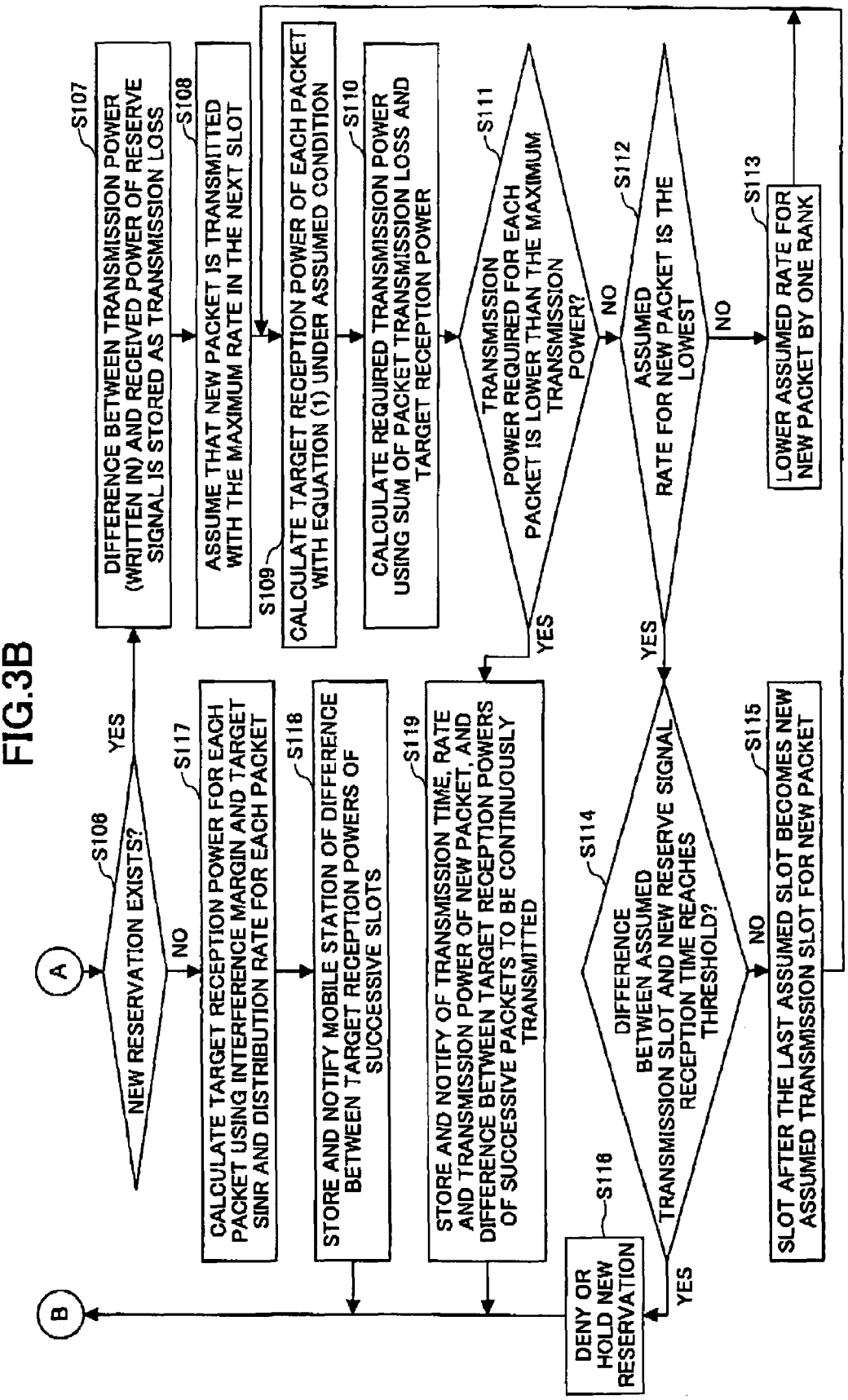

With reference to FIG. 3, controlling procedures according to a first embodiment are explained with respect to a case where the signal-to-interference power ratio is constant. When the TPC control is performed under the condition where the SIR is constant, a target reception power for its own cell packet during the next time unit is calculated and stored based on neighboring cell interference and its own allocation condition for the next time unit. Then transmission power control and allocation are performed for the new reservation.

Upon receiving a signal from the mobile station 13, the base station 11 measures reception power strength using the reception strength measuring unit 32(S102). The neighboring cell interference calculator 33 subtracts thermal noise and the total reception power allocated to packets in its own cell from the reception strength during the present time slot stored in the allocation memory 34, to calculate neighboring cell interference (S103). An average of the neighboring cell interference and variation in the neighboring cell interferences for successive time slots for the average are calculated. Deviation (the deviation is calculated over a long period (for example, one month)) of the neighboring cell interference variations during the successive time slots corresponding to the average, is revised (S104). Then the total sum of the present time slot neighboring cell interference and its corresponding interference deviation is set as an interference power margin for preparing for neighboring cell interference (S105).

When there is a new reservation (S106), an uplink transmission loss is estimated and stored based on a difference between the transmission power (that is written in the reserve signal by the mobile station) and reception power (that is measured by the base station.) (S107). Rate guarantee should be given to the interference variation against the existing packets. When an allocation is given to the new reservation, the following calculation is started from a slot after the slot receiving the reservation signal.

It is assumed that the maximum rate selected among various rates classified into several ranks is allocated to the new packet (S108). Under the assumed condition, Equation (1) is used to calculate a target reception power for each packet (S109). Based on the sum of the stored transmission loss for each packet and the target reception powers, a transmission power required for each packet is calculated (S110).

If the transmission power required for each packet does not exceed a threshold (for example, the maximum transmission power of the mobile station or a predetermined transmission power) (S111 YES), the assumed transmission time, rate and transmission power are allocated to the new packet, and a difference between the successive slots for the continuously transmitted packets is continuously transmitted to the mobile station (S119).

If the transmission power of any packet exceeds the maximum transmission power of the mobile station (S111 NO), the assumed rate is downgraded by one rank (S113) unless it is the minimum rate (S112). Then the above calculation is performed again (S109, S110, S111).

In a case where the maximum transmission power for every packet does not satisfy the required transmission power, even if the assumed rate for the new packet is downgraded to the minimum rate (S112 YES), a time difference between the assumed transmission slot and the reception time for the new reservation signal is compared with a threshold (S114). If the time difference does not reach the threshold, a slot after the slot assumed for the new packet is newly assumed (S115), and then the above calculation is repeated (S109, S110, S111).

If the time difference reaches the threshold (S114 YES), new packet reservation is denied or held.

In a case where there is not any new reservation (S106 NO), target reception powers are calculated using Equation (1) with respect to all the packets to be transmitted for the next slot (S117). The difference between the target reception power for the next slot and the target reception power for the present slot is stored and communicated to the mobile station (S118).

Figure 4:
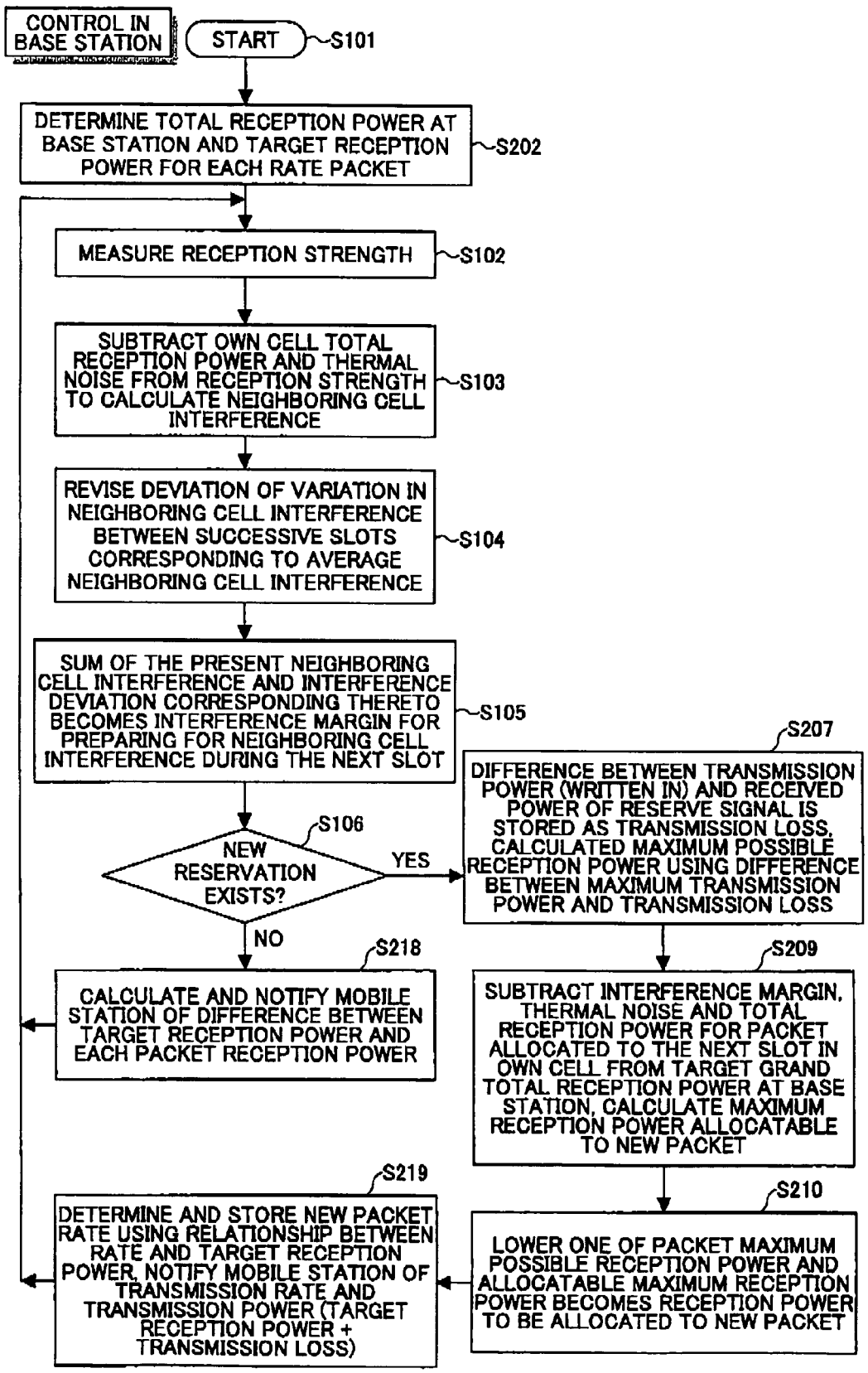
FIG. 4 is a flowchart illustrating base station controlling procedures when target reception power is constant.

With reference to FIG. 4, operations procedures according to a second embodiment in case where a TPC control is performed under a condition where a target reception power is constant, are given. When the TPC control is done under the condition where the reception power is constant, an allocation is made to the new reservation based on neighboring cell interference for the next time unit and allocation status in its own cell for the next time unit.

The operations of the radio base station 11 and the mobile station 13 in the second embodiment are the similar to those of the first embodiment (FIG. 2), except the function and operation of the uplink rate/transmission power determining unit 38.

When structuring the mobile communications system, it is needed to set the total target reception power (that is determined by the tradeoff of cell coverage and throughput, usually the total reception power/thermal noise=several dB–20 dB.) at the base station 11 and the target reception power for each packet (S202). The reception strength measuring unit 32 measures reception power strength for each slot (S102). The stored total reception power value allocated to its own cell packets for the present slot and the thermal noise are subtracted from the measured reception power strength, to calculate neighboring cell interference (S103).

An average of the neighboring cell interference and variation in the neighboring cell interferences for successive time slots for the average are calculated. Deviation (the deviation is calculated over a long period (for example, one month)) of the neighboring cell interference variations during the successive time slots corresponding to the average, is revised (S104). Then the total sum of the present time slot neighboring cell interference and its corresponding interference deviation is set as an interference power margin for preparing for neighboring cell interference (S105).

When there is a new reservation (S106), in order to obtain a reception power to be allocated to the new reservation, an uplink transmission loss is estimated based on a difference between the transmission power (that is written in the reserve signal by the mobile station) of the reservation signal and reception power (that is measured by the base station.), and the maximum possible reception power for the packets is calculated by the difference between the maximum transmission power of the mobile station 13 and the transmission loss (S207). The interference power margin, the thermal noise, and the total reception power for the already allocated packet during the next slot of its own cell, are subtracted from the grand total target reception power at the base station in order to calculate the possible maximum reception power that can be allocated to the new packet (S209).

A smaller one of the possible maximum reception power for packets and allocable maximum reception power becomes the reception power to be allocated to the new packet (S210). If the smaller one is smaller than a predetermined threshold (for example, zero), then no allocation is given to the new packet.

In accordance with the relationship between the transmission rate and the target reception power, a new packet rate is determined and stored, and a transmission rate and a transmission power (=target reception power+transmission loss) is communicated to the mobile station 13 (S219).

When there is not a new reservation (S106), the difference between target reception power generated due to fading, etc., and packet reception power is calculated and communicated to the mobile station (S218).

INDUSTRIAL APPLICABILITY

A base station according to the embodiments of the present invention can be utilized for improving throughput in mobile communications systems.

The present application is based on Japanese Priority Application No. 2003-379171 filed on Nov. 7, 2003 with the Japanese Patent Office, the entire contents of which are hereby incorporated by reference.

What is claimed is:

1. A mobile communications system wherein packet communication between a base station and subordinated mobile stations is established based on reservation packets, the packet communication using controlled transmission power and radio resources allocated based on reception quality information received from the mobile stations, the base station comprising:
    a memory configured to store all cell reception powers for the base station, transmitted from the mobile stations, based on radio resource allocation statuses for the mobile stations;
    a neighboring cell interference calculating unit configured to calculate a neighboring cell interference, based on the cell reception powers and the reception quality information;
    an interference margin determining unit configured to establish a neighboring cell interference margin for preparing for the neighboring cell interference; and
    a transmission power determining unit configured to determine transmission power for each packet transmitted from the mobile stations, based on the reception quality information and the interference margin,
    wherein the interference margin determining unit does not establish a margin for preparing for cell interference variations within a cell of the base station.

2. The base station as claimed in claim 1, further comprising:
    a packet allocating unit configured to allocate a predetermined packet value for a cell packet;
    wherein the transmission power determining unit is configured to determine, based on the predetermined packet value and the interference margin, when the radio resource is to be allocated to the cell packet as a new reservation.

3. The base station as claimed in claim 1, wherein a rate assumed for the new packet is changed and the interference margin is calculated with respect to the changed rate, when the transmission power required for any packet exceeds a maximum transmission power of the mobile station.

4. The base station as claimed in claim 1, wherein a rate assumed for the new packet is allocated and a difference between the reception powers is communicated to the mobile station, when the transmission powers required for all packets do not exceed a threshold.

5. A mobile communications system wherein packet communication between a base station and subordinated mobile stations is established based on reservation packets, the packet communication using controlled transmission power and radio resources allocated based on reception quality information received from the mobile stations, a transmission power determining method comprising the steps of:

storing, in a memory, all cell reception powers transmitted from the mobile stations, based on radio resource allocation statuses for the mobile stations;

calculating, in a neighboring interference calculating unit, a neighboring cell interference, based on the cell reception powers and the reception quality information;

determining, in an interference margin determining unit that does not establish a margin for preparing for cell variations within a cell of the base station, a neighboring cell interference margin for preparing for the neighboring cell interference; and determining, in a transmission power determining unit, a transmission power for each packet transmitted from the mobile stations based on the reception quality information and the interference margin.

6. The method as claimed in claim 5, further comprising the step of:

allocating, in a packet allocating unit, a predetermined packet value for a cell packet;

wherein the transmission power determining unit determines based on the predetermined packet value and the interference margin when the radio resource is allocated to the packet as a new reservation.

7. The method as claimed in claim 5, wherein a rate assumed for the new packet is changed and the interference margin is calculated with respect to the changed rate, when the transmission power required for any packet exceeds a maximum transmission power of the mobile station.

8. The method as claimed in claim 5, wherein a rate assumed for the new packet is allocated and a difference between the reception powers is communicated to the mobile station, when the transmission powers required for all packets do not exceed a threshold.

* * * * *